(12) United States Patent
Ono

(10) Patent No.: US 7,119,851 B2
(45) Date of Patent: Oct. 10, 2006

(54) IMAGE PROCESSING APPARATUS AND CONTROL METHOD THEREOF

(75) Inventor: Kenichiro Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 10/347,375

(22) Filed: Jan. 21, 2003

(65) Prior Publication Data

US 2003/0142235 A1 Jul. 31, 2003

(30) Foreign Application Priority Data

Jan. 22, 2002 (JP) ............................ 2002-013103
Jan. 15, 2003 (JP) ............................ 2003-006889

(51) Int. Cl.
*H04N 1/393* (2006.01)
*H04N 5/445* (2006.01)

(52) U.S. Cl. .................. 348/581; 348/561; 348/564; 348/584; 348/554; 348/555; 382/298

(58) Field of Classification Search ................ 348/554, 348/555, 556, 561, 563, 564, 565, 581, 584, 348/588, 704; 725/38, 39, 40; 386/46, 1, 386/124; 382/298, 299
See application file for complete search history.

(56) References Cited

U.S. PATENT DOCUMENTS

| | | | | |
|---|---|---|---|---|
| 5,109,279 | A * | 4/1992 | Ando ........................ | 348/564 |
| 5,374,963 | A | 12/1994 | Willis ....................... | 348/564 |
| 5,455,632 | A * | 10/1995 | Ichihara .................... | 348/565 |
| 5,969,767 | A * | 10/1999 | Ishikawa et al. ........... | 348/564 |
| 6,008,860 | A * | 12/1999 | Patton et al. .............. | 348/565 |
| 6,172,715 | B1 * | 1/2001 | Cho .......................... | 348/565 |
| 6,239,794 | B1 * | 5/2001 | Yuen et al. ................. | 725/41 |
| 6,384,868 | B1 * | 5/2002 | Oguma ...................... | 348/564 |
| 6,441,862 | B1 * | 8/2002 | Yuen et al. ................. | 348/565 |
| 6,459,456 | B1 * | 10/2002 | Oh ............................ | 348/564 |
| 6,477,705 | B1 * | 11/2002 | Yuen et al. ................. | 725/41 |
| 6,493,038 | B1 * | 12/2002 | Singh et al. ................ | 348/565 |
| 6,606,747 | B1 * | 8/2003 | Yuen et al. ................. | 725/40 |
| 6,665,017 | B1 * | 12/2003 | Raiyat ....................... | 348/468 |
| 6,697,123 | B1 * | 2/2004 | Janevski et al. ............ | 348/565 |
| 6,697,124 | B1 * | 2/2004 | Dimitrova et al. .......... | 348/565 |
| 6,732,371 | B1 * | 5/2004 | Lee et al. ................... | 725/41 |
| 6,753,928 | B1 * | 6/2004 | Gospel et al. .............. | 348/569 |

FOREIGN PATENT DOCUMENTS

JP 10-304287 11/1998
WO WO 98/48566 10/1998

* cited by examiner

*Primary Examiner*—David Ometz
*Assistant Examiner*—Jean W. Désir
(74) *Attorney, Agent, or Firm*—Fitzpatrick, Cella, Harper & Scinto

(57) ABSTRACT

An image processing apparatus is capable of displaying a first image obtained from a broadcast wave and a second image reproduced from a storage medium on a display unit. The apparatus comprises a first image processing unit adapted to increase a size of the first image if an instruction for temporarily stopping a reproduction of the second image is detected while the first image and the secod image are displayed on the display unit; and a second image processing unit adapted to decrease a size of the second image if the instruction for temporarily stopping the reproduction of the second image is detected while the first image and the second image are displayed on the display unit.

6 Claims, 11 Drawing Sheets

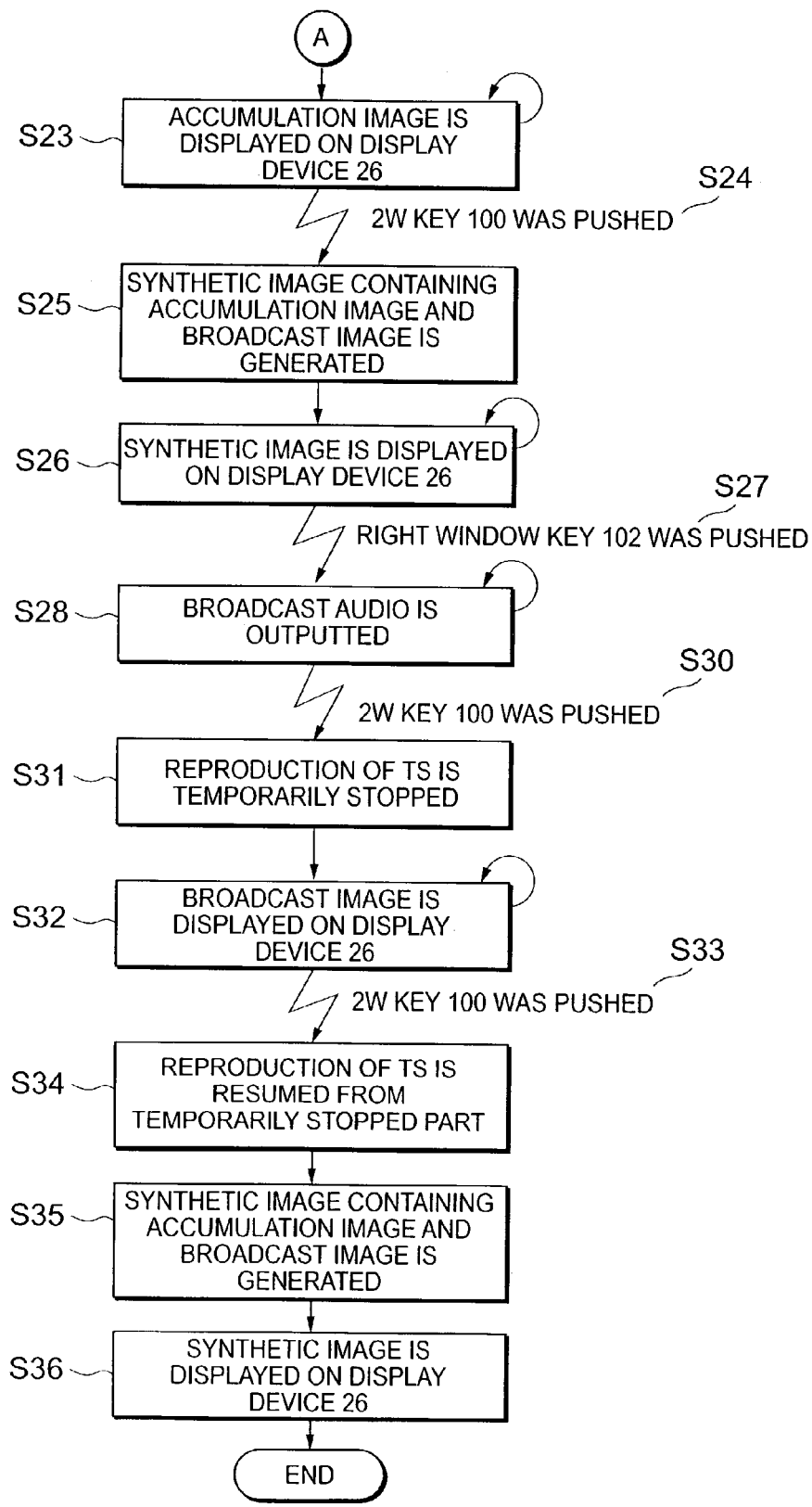

STATE OF HDD30: REPRODUCTION

2W KEY 100 WAS PUSHED WHILE BROADCAST IMAGE IS SELECTED

STATE OF HDD30: TEMPORARY STOP

2W KEY 100 WAS PUSHED

STATE OF HDD30: REPRODUCTION

STATE OF HDD30: TEMPORARY STOP

IMAGE PROCESSING APPARATUS AND CONTROL METHOD THEREOF

BACKGROUND OF THE INVENTION

1. Field of the Invention

The present invention relates to an image processing apparatus having a display mode for displaying an image obtained from a broadcast wave and an image reproduced from a storage medium, and a control method thereof.

2. Related Background Art

Regarding conventional image processing apparatus, there has been known an apparatus having a display mode for displaying an image obtained from a broadcast wave (broadcast image, hereinafter) and an image reproduced from a storage medium (accumulation image, hereinafter) (see Japanese Patent Application Laid-Open No. 10-304287).

However, in the conventional image processing apparatus, when the display mode for displaying the broadcast image and the accumulation image is switched to a display mode for displaying only the broadcast image, the reproduction of the accumulation image cannot be stopped automatically or temporarily. Consequently, a user must instruct a stoppage or a temporary stoppage of the reproduction of the accumulation image after the display mode is switched, which makes an operation complex.

Additionally, in the conventional image processing apparatus, even if the reproduction of the accumulation image is temporarily stopped while the broadcast image and the accumulation image are displayed, a size of the broadcast image cannot be automatically increased. If the size of the broadcast image can be automatically increased, the broadcast image can be made easier to be viewed than the accumulation image. However, the conventional image processing apparatus has no such functions.

SUMMARY OF THE INVENTION

An object of the present invention is to overcome the above-described drawbacks.

Another object of the present invention is to improve operability of an image processing apparatus having a display mode for displaying a broadcast image and an accumulation image.

According to one of the preferred embodiments of the present invention, there is provided an image processing apparatus having a first display mode for displaying the first image obtained from a broadcast wave and a second image reproduced from a storage medium on display means, and a second display mode for displaying the first image on the display means but not displaying the second image, the apparatus comprising: control means for stopping the reproduction of the second image when an instruction for switching the first display mode to the second display mode is detected.

According to one of the preferred embodiments of the present invention, there is provided a control method in an image processing apparatus having a first display mode for displaying a first image obtained from a broadcast wave and a second image reproduced from a storage medium on display means, and a second display mode for displaying the first image on the display means but not displaying the second image on the display means, the method comprising the steps of: detecting an instruction for switching the first display mode to the second display mode; and stopping the reproduction of the second image when the instruction is detected.

According to one of the preferred embodiments of the present invention, there is provided an image processing apparatus having a display mode for displaying a first image obtained from a broadcast wave and a second image reproduced from a storage medium on display means, the apparatus comprising: synthesizing means for not synthesizing the first image and the second image when an instruction for temporarily stopping the reproduction of the second image is detected while the first image and the second image are displayed on the display means.

According to one of the preferred embodiments of the present invention, there is provided a control method in an image processing apparatus having a display mode for displaying a first image obtained from a broadcast wave and a second image reproduced from a storage medium on display means, the method comprising the steps of: detecting an instruction for temporarily stopping the reproduction of the second image while the first image and the second image are displayed on the display means; and executing control not to synthesize the first image and the second image when the instruction is detected.

According to one of the preferred embodiments of the present invention, there is provided an image processing apparatus having a first display mode for displaying a first image obtained from a broadcast wave and a second image reproduced from a storage medium on display means, and a second display mode for displaying the second image on the display means but not displaying the first image, the apparatus comprising: determining means for determining whether an instruction for switching the first display mode to the second display mode is detected or not; and recording means for starting recording of the first image when the instruction is detected.

According to one of the preferred embodiments of the present invention, there is provided a control method in an image processing apparatus having a first display mode for displaying a first image obtained from a broadcast wave and a second image reproduced from a storage medium on display means, and a second display mode for displaying the second image on the display means but not displaying the first image, the method comprising the steps of: determining whether an instruction for switching the first display mode to the second display mode is detected or not; and starting recording of the first image when the instruction is detected.

According to one of the preferred embodiments of the present invention, there is provided an image processing apparatus capable of displaying a first image obtained from a broadcast wave and a second image reproduced from a storage medium on a display unit, the apparatus comprising: a first image processing unit adapted to increase a size of the first image if an instruction for temporarily stopping a reproduction of the second image is detected while the first image and the second image are displayed on the display unit; and a second image processing unit adapted to decrease a size of the second image if the instruction for temporarily stopping the reproduction of the second image is detected while the first image and the second image are displayed on the display unit.

According to one of the preferred embodiments of the present invention, there is provided a method used in an image processing apparatus capable of displaying a first image obtained from a broadcast wave and a second image reproduced from a storage medium on a display unit, the method comprising the steps of: increasing a size of the first image if an instruction for temporarily stopping a reproduction of the second image is detected while the first image and the second image are displayed on the display unit; and decreasing a size of the second image if the instruction for temporarily stopping the reproduction of the second image is detected while the first image and the second image are displayed on the display unit.

Still other objects, features and advantages of the present invention will become fully apparent from the following detailed description of the preferred embodiments.

BRIEF DESCRIPTION OF THE DRAWINGS

FIG. 5 is a flowchart showing a remaining part of the operation process of the image processing apparatus of the first embodiment.

DESCRIPTION OF THE PREFERRED EMBODIMENTS

Next, a plurality of embodiments of the present invention will be described in detail with reference to the accompanying drawings.

First Embodiment

Figure 1:
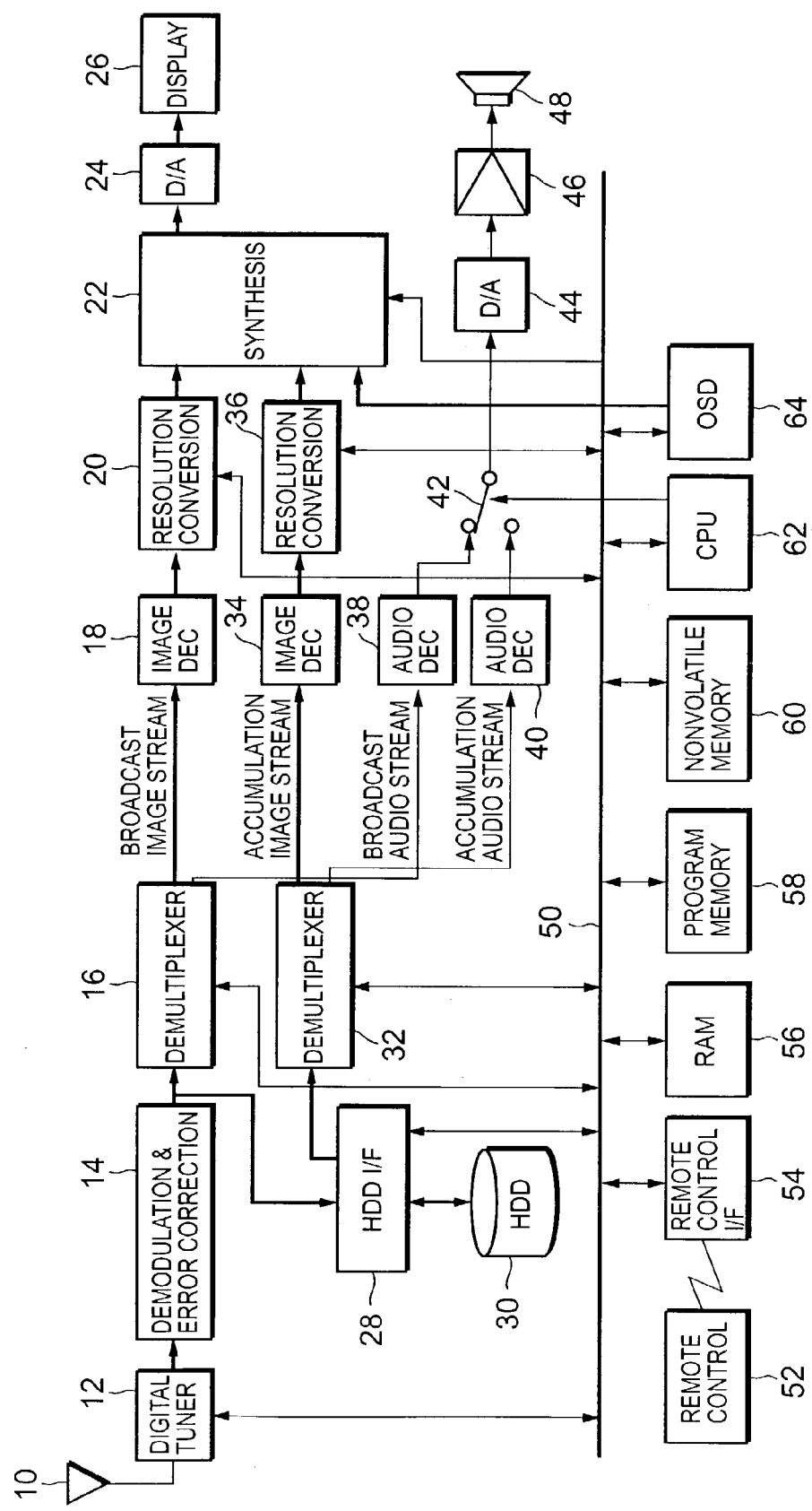
FIG. 1 is a block diagram showing main components of an image processing apparatus of each embodiment.

FIG. 1 shows main components of a digital broadcast receiver which is an image processing apparatus of each embodiment of the present invention. The image processing apparatus receives a digital broadcast compliant with digital video broadcasting (DVB). Additionally, the image processing apparatus complies with an MPEG-2 system (reference: ISO/IEC 13818-1 International Standard MPEG-2 Systems), an MPEG-2 video (reference: ISO/IEC 13818-2 International Standard MPEG-2 Video) and an MPEG-2 audio (reference: ISO/IEC 13818-3 International Standard MPEG-2 Audio).

A central processing unit (CPU) 62 controls functions of the image processing apparatus in accordance with programs recorded in a program memory 58. The program memory 58 is a storage medium for recording programs to be executed by the CPU 62. A bus 50 connects the CPU 62 with other circuits. A random access memory (RAM) 56 is a work memory of the CPU 62. A nonvolatile memory 60 is a memory for recording a state of the image processing apparatus when a power supply is turned OFF.

An antenna 10 receives the digital broadcast compliant with the DVB. A digital tuner 12 receives a transport stream designated by the CPU 62. A demodulation & error correction unit 14 demodulates the transport stream obtained from the digital tuner 12 to correct its error.

A demultiplexer 16 separates an image stream (broadcast image stream, hereinafter) and an audio stream (broadcast audio stream, hereinafter) from the transport stream obtained from the demodulation & error correction unit 14, and supplies the broadcast image stream to an image decoder 18 and the broadcast audio stream to the audio decoder 38.

The image decoder 18 decodes the broadcast image stream supplied from the demultiplexer 16 and generates the broad cast image. A resolution conversion unit 20 adjusts a resolution of the broadcast image obtained from the image decoder 18 to change a size of the broadcast image.

An HDD interface 28 records the transport stream obtained from the demodulation & error correction unit 14 in a hard disk drive (HDD) 30, and reproduces a transport stream designated by the CPU 62 from the HDD 30.

A demultiplexer 32 separates an image stream (accumulation image stream, hereinafter) and an audio stream (accumulation audio stream, hereinafter) from the transport stream obtained from the HDD interface 28, and supplies the accumulation image stream to an image decoder 34 and the accumulation audio stream to an audio decoder 40.

The image decoder 34 decodes the accumulation image stream obtained from the demultiplexer 32 and generates the accumulation image. A resolution conversion unit 36 adjusts a resolution of an accumulation image obtained from the image decoder 34 to change a size of the accumulation image.

A synthesis unit 22 outputs, in accordance with an instruction from the CPU 62, any one of the broadcast image obtained from the resolution conversion unit 20, the accumulation image obtained from the resolution conversion unit 34, and a synthetic image containing the broadcast image obtained from the resolution conversion unit 20 and the accumulation image obtained from the resolution conversion unit 34. Additionally, the synthesis unit 22 superposes, in accordance with an instruction from the CPU 62, display information obtained from an on-screen display (OSD) 64 on a part of the broadcast image, and display information obtained from the OSD 64 on a part of the accumulation image. A D/A converter 24 subjects the broadcast image, the accumulation image or the synthetic image outputted from the synthesis unit 22 to D/A conversion. A display device 26 displays the broadcast image, the accumulation image or the synthetic image obtained from the D/A converter 24.

The audio decoder 38 decodes the broadcast audio stream supplied from the demultiplexer 16 to generate a broadcast audio. The audio decoder 40 decodes the accumulation audio stream supplied from the demultiplexer 32 to generate an accumulation audio.

A switch 42 selects the audio decoder 38 or 40 in accordance with an instruction from the demultiplexer 16. A D/A converter 44 subjects the broadcast audio or the accumulation audio obtained from the switch 42 to D/A conversion. An amplifier 46 amplifies the broadcast audio or the accumulation audio obtained from the D/A converter 44. A speaker 48 outputs the broadcast audio or the accumulation audio obtained from the amplifier 46.

A remote controller 52 remote-controls the image processing apparatus. A remote control interface 54 receives a remote control code outputted from the remote controller 52, and supplies the received remote control code to the CPU 62.

Figure 2:
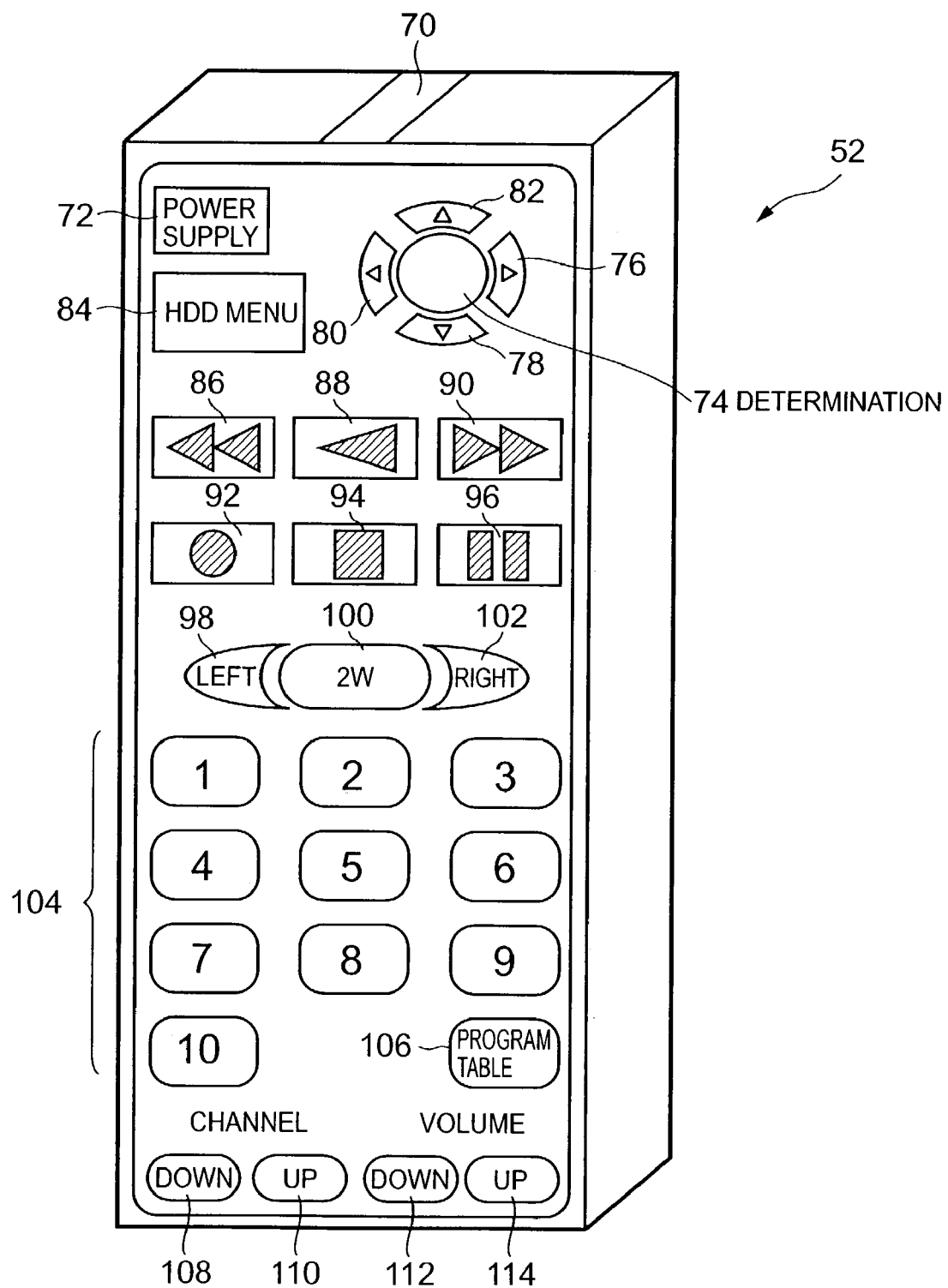
FIG. 2 is a view showing a remote controller 52 and operation keys thereof.

FIG. 2 shows the remote controller 52 and operation keys thereof.

A reference numeral 70 denotes a transmission unit. The transmission unit 70 outputs a corresponding remote control code when one of the keys 72 to 114 is pushed.

A reference numeral 72 denotes a power supply key, 84 an HDD menu key, 74 a determination key, 76 a right cursor key, 78 a lower cursor key, 80 a left cursor key, and 82 an upper cursor key.

Reference numerals 86 to 96 denote operation keys for controlling the HDD 30: 86 a fast-return key, 88 a reproduction key, 90 a fast-forward key, 92 a recording key, 94 a stop key, and 96 a pause key.

A reference numeral 104 denotes a channel selection key, and 106 a program table key. When pushing of the program table key 106 is detected, the CPU 62 displays an electronic program table (EPG) on the display device 26. A reference numeral 108 denotes a channel down key, and 110 a channel up key. A reference numeral 112 denotes a volume down key, and 114 a volume up key.

Reference numerals 98 to 102 denote window control keys: 100 a 2-window key for switching a display mode to a 2-window mode (display mode for displaying an accumulation image and a broadcast image on the display device 26), 98 a left window key, and 102 a right window key. When the left window key 98 is pushed on the 2-window mode, the left window becomes active and an audio corresponding to an image on the left window is outputted from the speaker 48. On the other hand, when the right window key 102 is pushed on the 2-window mode, the right window becomes active and an audio corresponding to an image on the right window is outputted from the speaker 48.

Figure 4:
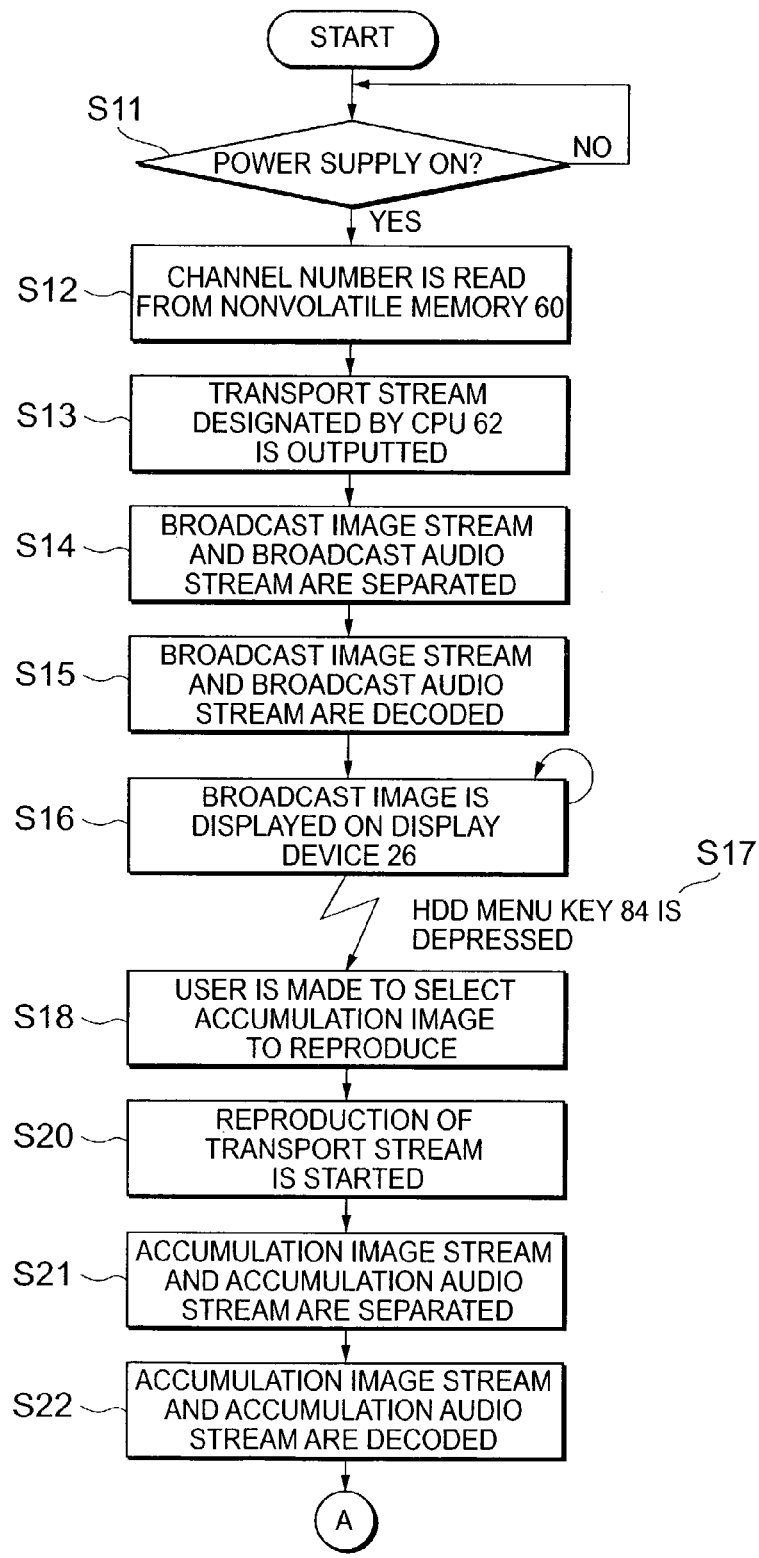
FIG. 4 is a flowchart showing a part of an operation process of an image processing apparatus of a first embodiment.

FIGS. 4 and 5 are flowcharts explaining an operation process of the image processing apparatus of a first embodiment.

Step S11: the CPU 62 determines whether a power supply is ON or not. If the power supply is ON, the process proceeds to step S12. In this case, the CPU 62 is set on a broadcast mode (display mode for displaying a broadcast image but not an accumulation image on the display device 26).

Step S12: the CPU 62 reads a channel number stored in the nonvolatile memory 60 (channel number written in the nonvolatile memory 60 by the CPU 62 when a power supply is turned OFF), and instructs the digital tuner 12 to receive a broadcast wave corresponding to the channel number.

Step S13: the digital tuner 12 outputs a transport stream designated by the CPU 62. The demodulation & error correction unit 14 demodulates the transport stream obtained from the digital tuner 12 to correct its error.

Step S14: the demultiplexer 16 separates a broadcast image stream and a broadcast audio stream from the transport stream obtained from the demodulation and error correction unit 14, and supplies the broadcast image stream to the image decoder 18 and the broadcast audio stream to the audio decoder 38.

Step S15: the image decoder 18 starts decoding of the broadcast image stream, and the audio decoder 38 also starts decoding of the broadcast audio stream. The resolution conversion unit 20 adjusts a resolution of the broadcast image obtained from the image decoder 18 to match a size of the broadcast image with a screen size of the display device 26. The OSD 64 generates display information (e.g., "6ch") indicating a channel number of the broadcast image.

The synthesis unit 22 superposes the display information obtained from the OSD 64 on a part of the broadcast image obtained from the resolution conversion unit 20, and supplies the broadcast image to the D/A converter 24. The switch 42 selects a broadcast audio obtained from the audio decoder, and supplies it to the D/A converter 44.

Step S16: the display device 26 displays a broadcast image obtained from the D/A converter 24. The speaker 48 outputs a broadcast audio obtained from the amplifier 46.

Step S17: the CPU 62 determines whether the HDD menu key 84 has been pushed or not. If the pushing of the HDD menu key 84 is detected, the CPU 62 starts control for the process from step S18 to step S23. In this case, the CPU 62 is set on an HDD mode from the broadcast mode (display mode for displaying an accumulation image but not a broadcast image on the display device 26).

Figure 3:
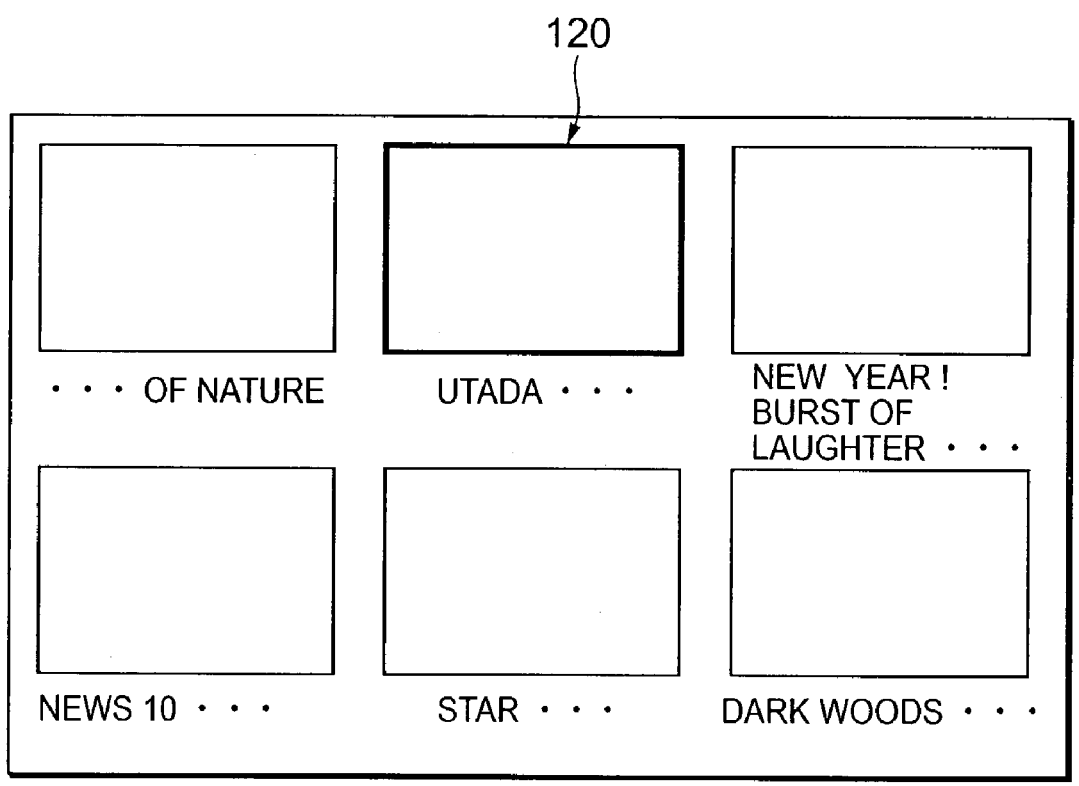
FIG. 3 is a view showing an example of a menu screen for an HDD 30.

Step S18: the CPU 62 causes the OSD 64 to generate a menu screen for the HDD 30, and display the menu screen on the display device 26. FIG. 3 shows an example of a menu screen displayed on the display device 26. According to the embodiment, as shown in FIG. 3, a title of an accumulation image recorded in the HDD 30 and a thumbnail image are displayed on the menu screen. A user uses the cursor keys 76 to 82 and the determination key 74 to select an accumulation image to be reproduced. A reference numeral 120 of FIG. 3 denotes the thumbnail image of an accumulation image selected by the user.

Step S20: the HDD interface 28 starts reproduction of a transport stream of the accumulation image selected by the user.

Step S21: the demultiplexer 32 separates an accumulation image stream and an accumulation audio stream from the transport stream obtained from the HDD interface 28, and supplies the accumulation image stream to the image decoder 34 and the accumulation audio stream to the audio decoder 40.

Step S22: the image decoder 34 starts decoding of the accumulation image stream, and the audio decoder 40 also starts decoding of the accumulation audio stream. The resolution conversion unit 36 adjusts a resolution of the accumulation image obtained from the image decoder 34 to math a size of the accumulation image with a screen size of the display device 26. The OSD 64 generates display information (e.g., "HDD PLAY") indicating on-going reproduction of the accumulation image. The synthesis unit 22 superposes the display information obtained from the OSD 64 on a part of the accumulation image obtained from the resolution conversion unit 36, and supplies the accumulation image to the D/A converter 24. The switch 42 selects an accumulation audio obtained from the audio decoder 40, and supplies it to the D/A converter 44.

Step S23: the display device 26 displays an accumulation image obtained from the D/A converter 24. The speaker 48 outputs an accumulation audio obtained from the amplifier 46.

Step S24: the CPU 62 determines whether the 2-window key 100 has been pushed or not. If the pushing of the 2-window key 100 is detected, the CPU 62 starts control for the process from step S25 to step S26. In this case, the CPU 62 is set on a 2-window mode from the HDD mode (display mode for displaying a broadcast image and an accumulation image on the display device 26). Additionally, the CPU62 makes a window (left window) that displays the accumulation image active.

Step S25: the resolution conversion unit 20 adjusts a resolution of the broadcast image obtained from the image decoder 18 (image of a channel last seen by the user) to set a size of the broadcast image to a size of about ¼ of a screen size of the display device 26. The OSD 64 generates display information (e.g., "6ch") indicating a channel number of the broadcast image. The synthesis unit 22 superposes the display information obtained from the OSD 64 on a part of the broadcast image obtained from the resolution conversion unit 20. On the other hand, the resolution conversion unit 36 adjusts a resolution of the accumulation image obtained from the image decoder 34 to set a size of the accumulation image to a size of about ¼ of a screen size of the display device 26. The OSD 64 generates display information (e.g., "HDD PLAY") indicating ongoing reproduction of the accumulation image. The synthesis unit 22 superposes the display information obtained from the OSD 64 on a part of the accumulation image obtained from the resolution conversion unit 36.

Figure 6A:
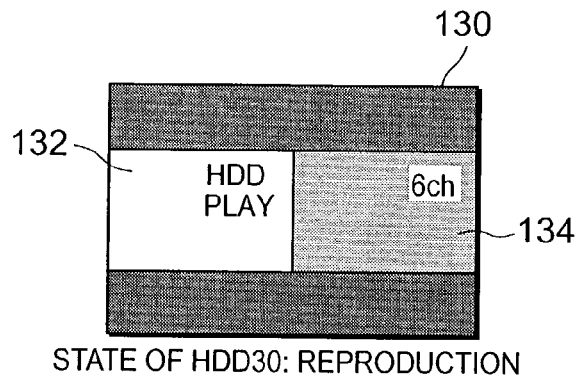
FIGS. 6A, 6B and 6C are views each showing an example of an image displayed on a display device 26 of FIG. 1.

Step S26: the synthesis unit 22 generates a synthetic image containing the broadcast image obtained from the resolution conversion unit 20 and the accumulation image obtained from the resolution conversion unit 36. The D/A converter 24 subjects the synthetic image obtained from the synthetic unit 24 to D/A conversion. The display device 26 displays the synthetic image obtained from the D/A converter 24. An example of an image displayed on the display device 26 at this time is shown in FIG. 6A. In FIG. 6A, a reference numeral 130 denotes a screen of the display device 26, 132 an accumulation image, and 134 a broadcast image. Additionally at this time, an accumulation audio is outputted from the speaker 48. In order to switch the audio outputted from the speaker 48 to a broadcast audio, the user only needs to push the right window key 102 (because the broadcast image is displayed on the right of the screen).

Step S27: the CPU 62 determines whether the right window key 102 has been pushed or not. If the pushing of the right window key 102 is detected, the CPU 62 makes the right window active, and starts control for the process of step S28.

Step S28: the switch 42 selects the broadcast audio obtained from the audio decoder 38, and supplies it to the D/A converter 44. The speaker 48 outputs the accumulation audio obtained from the amplifier 46. At this time, in order to raise a volume of the broadcast audio, the user only needs to push the volume up key 114. In order to lower the volume of the broadcast audio, the user only needs to push the volume down key 112. If the user wishes to display a broadcast image of another channel on the right window, the user only needs to push the channel down key 108 or the channel up key 110.

Step S30: the CPU 62 determines whether the 2-window key 100 has been pushed or not. If the pushing of the 2-window key 100 is detected, the CPU 62 starts control for the process from step S31 to step S32. In this case, the CPU 62 is set on a broadcast mode from the 2-window mode because the right window displaying the broadcast image is active.

Step S31: the HDD interface 28 temporarily stops the reproduction of the transport stream automatically. The switch 42 selects a broadcast audio obtained from the audio decoder 38, and supplies it to the D/A converter 44. The speaker 48 outputs the broadcast audio obtained from the amplifier 46.

Figure 6B:
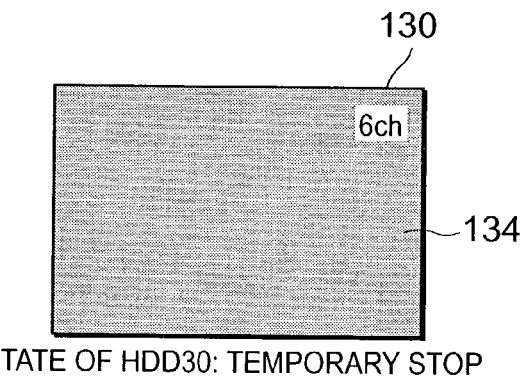

Step S32: the resolution conversion unit 20 adjusts a resolution of the broadcast image obtained from the image decoder 18 to match a size of the broadcast image with a screen size of the display device 26. The OSD 64 generates display information (e.g., "6ch") indicating a channel number of the broadcast image. The synthesis unit 22 synthesizes the display information obtained from the OSD 64 and the broadcast image obtained from the resolution conversion unit 20. Additionally, the synthesis unit 22 does not synthesize the broadcast image and the accumulation image whose reproduction has been temporarily stopped, and supplies only the broadcast image to the D/A converter 24. The D/A converter 24 subjects the broadcast image obtained from the synthesis unit 22 to D/A conversion. The display device 26 displays the broadcast image obtained from the D/A converter 24. FIG. 6B shows an example of an image displayed by the display device 26 at this time. In FIG. 6B, a reference numeral 130 denotes a screen of the display device 26, and 134 a broadcast image. As shown in FIG. 6B, as the broadcast image can be displayed on the entire screen, the broadcast image can be made easier to be viewed.

Step S33: the CPU 62 determines whether the 2-window key 100 has been pushed or not. If the pushing of the 2-window key 100 is detected, the CPU 62 starts control for the process from step S34 to step S36. In this case, the CPU 62 returns to the 2-window mode from the broadcast mode.

Step S34: the HDD interface 28 automatically resumes the reproduction of the transport stream from the part temporarily stopped in step S31.

Step S35: the resolution conversion unit 20 adjusts a resolution of the broadcast image obtained from the image decoder 18 to set a size of the broadcast image to a size of about ¼ of a screen size of the display device 26. The OSD 64 generates display information (e.g., "6ch") indicating a channel number of the broadcast image. The synthesis unit 22 superposes the display information obtained from the OSD 64 on a part of the broadcast image obtained from the resolution conversion unit 20. On the other hand, the resolution conversion unit 36 adjusts a resolution of the accumulation image obtained from the image decoder 34 to set a size of the accumulation image to a size of about ¼ of a screen size of the display device 26. The OSD 64 generates display information (e.g., "HDD PLAY") indicating ongoing reproduction of the accumulation image. The synthesis unit 22 superposes the display information obtained from the OSD 64 on a part of the accumulation image obtained from the resolution conversion unit 36.

Figure 6C:
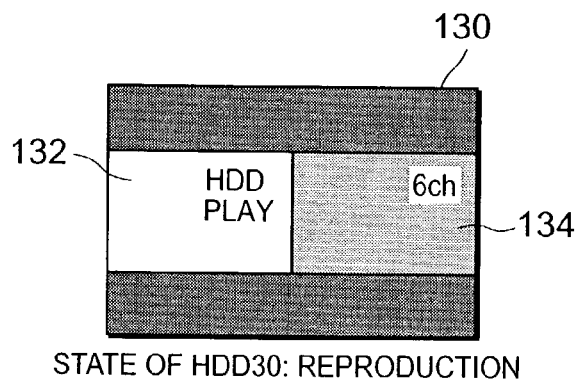

Step S36: the synthesis unit 22 generates a synthetic image containing the broadcast image obtained from the resolution conversion unit 20 and the accumulation image obtained from the resolution conversion unit 36. The D/A converter 24 subjects the synthetic image obtained from the synthesis unit 22 to D/A conversion. The display device 26 displays the synthetic image obtained from the D/A converter 24. FIG. 6C shows an example of an image displayed by the display device 26 at this time. In FIG. 6C, a reference numeral 130 denotes a screen of the display device 26, 132 an accumulation image, and 134 a broadcast image. Additionally at this time, in order to switch an audio outputted from the speaker 48 to an accumulation audio, the user only needs to push the left window key 98 (because the accumulation image is displayed on the left of the screen).

As discussed above, according to the image processing apparatus of the first embodiment, when the 2-window mode (display mode for displaying the synthetic image containing the broadcast image and the accumulation image on the display device 26) is switched to the broadcast mode (display mode for displaying only the broadcast image on the display device 26), the reproduction of the accumulation image and the accumulation audio can be temporarily stopped automatically. Thus, it is possible to omit time and labor for instructing the image processing apparatus to temporarily stop the reproduction, whereby convenience is provided.

According to the image processing apparatus of the first embodiment, when the display mode for displaying only the broadcast image is switched back to the display mode for displaying the synthetic image containing the broadcast image and the accumulation image, the reproduction of the accumulation image and the accumulation audio can be automatically resumed from the temporarily stopped part. Thus, it is possible to omit time and labor for instructing the image processing apparatus to resume the reproduction.

The aforementioned functions of the first embodiment can also be realized by programs to be executed by the CPU 62 of FIG. 1.

Furthermore, the image processing apparatus shown in FIG. 1 uses the hard disk drive. However, the apparatus can also be realized by using a storage medium such as a tape drive or a magneto-optical disk.

Second Embodiment

Figure 7:
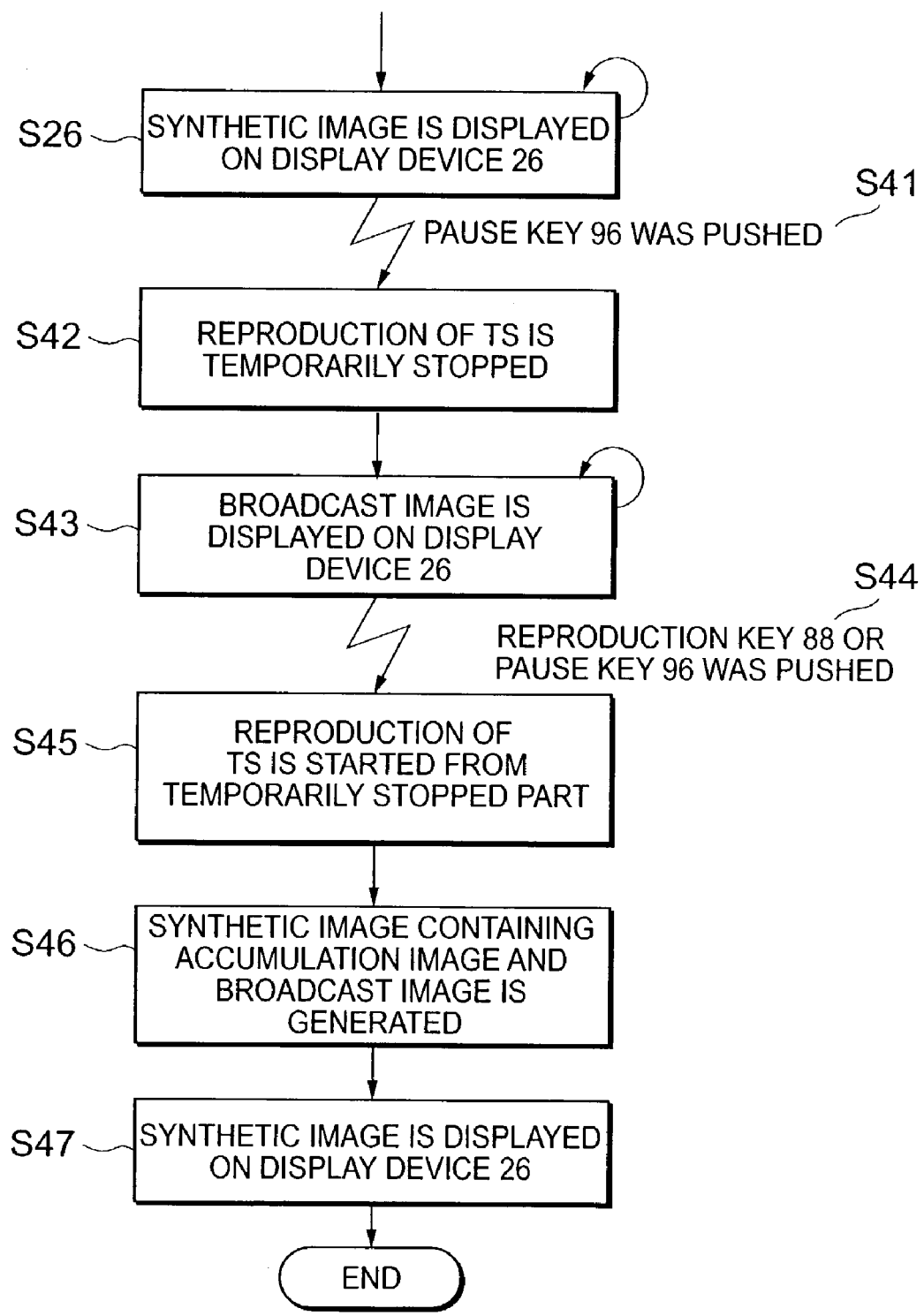
FIG. 7 is a flowchart showing an operation process of an image processing apparatus of a second embodiment.

FIG. 7 is a flowchart explaining an operation process of the image processing apparatus of a second embodiment. The image processing apparatus of the second embodiment is similar in constitution and functions to the image processing apparatus of the first embodiment, and thus detailed description thereof will be omitted. Additionally, the process from step S11 to step S22 of FIG. 4, and the process from step S23 to step S26 of FIG. 5 are also similar to those of the first embodiment, and thus detailed description will be omitted.

Step S41: after the process of step S26, the CPU 62 determines whether the pause key 96 has been pushed or not. If the pushing of the pause key 96 is detected (i.e., instruction to request a temporary stoppage of the reproduction of the accumulation image and the accumulation audio is detected), the CPU 62 starts control for the process from step S42 to step S43.

Step S42: the HDD interface 28 temporarily stops the reproduction of the transport stream automatically. The switch 42 selects a broadcast audio obtained from the audio decoder 38, and supplies it to the D/A converter 44. The speaker 48 automatically starts outputting of the broadcast audio obtained from the amplifier 46.

Step S43: the resolution conversion unit 20 adjusts a resolution of the broadcast image obtained from the image decoder 18 to match a size of the broadcast image with a screen size of the display device 26. The OSD 64 generates display information (e.g., "6ch") indicating a channel number of the broadcast image. The synthesis unit 22 superposes the display information obtained from the OSD 64 on a part of the broadcast image obtained from the resolution conversion unit 20. At this time, the synthesis unit 22 can also synthesize display information (icon or the like) indicating a temporary stoppage of the reproduction of the accumulation image with the broadcast image. Additionally, the synthesis unit 22 does not synthesize the broadcast image and the accumulation image whose reproduction has been temporarily stopped, and supplies only the broadcast image to the D/A converter 24. The D/A converter 24 subjects the broadcast image obtained from the synthesis unit 22 to D/A conversion. The display device 26 displays the broadcast image obtained from the D/A converter 24. FIG. 6B shows an example of an image displayed by the display device 26 at this time. In FIG. 6B, a reference numeral 130 denotes a screen of the display device 26, and 134 a broadcast image. As shown in FIG. 6B, as the broadcast image can be displayed on the entire screen, the broadcast image can be made easier to be viewed.

Step S44: the CPU 62 determines whether the reproduction key 88 or the pause key 96 has been pushed or not. If the pushing of the reproduction key 88 or the pause key 96 is detected (i.e., instruction to request resumption of the reproduction of the accumulation image and the accumulation audio is detected), the CPU 62 starts control for the process from step S45 to step S47.

Step S45: the HDD interface 28 automatically resumes the reproduction of the transport stream from the part temporarily stopped in step S42. The switch 42 selects an accumulation audio obtained from the audio decoder 40, and supplies it to the D/A converter 44. The speaker 48 automatically starts outputting of the accumulation audio obtained from the amplifier 46.

Step S46: the resolution conversion unit 20 adjusts a resolution of the broadcast image obtained from the image decoder 18 to set a size of the broadcast image to a size of about ¼ of a screen size of the display device 26. The OSD 64 generates display information (e.g., "6ch") indicating a channel number of the broadcast image. The synthesis unit 22 superposes the display information obtained from the OSD 64 on a part of the broadcast image obtained from the resolution conversion unit 20. On the other hand, the resolution conversion unit 36 adjusts a resolution of the accumulation image obtained from the image decoder 34 to set a size of the accumulation image to a size of about ¼ of a screen size of the display device 26. The OSD 64 generates display information (e.g., "HDD PLAY") indicating on-going reproduction of the accumulation image. The synthesis unit 22 superposes the display information obtained from the OSD 64 on a part of the accumulation image obtained from the resolution conversion unit 36.

Step S47: the synthesis unit 22 generates a synthetic image containing the broadcast image obtained from the resolution conversion unit 20 and the accumulation image obtained from the resolution conversion unit 36. The D/A converter 24 subjects the synthetic image obtained from the synthesis unit 22 to D/A conversion. The display device 26 displays the synthetic image obtained from the D/A converter 24. FIG. 6C shows an example of an image displayed by the display device 26 at this time. In FIG. 6C, a reference numeral 130 denotes a screen of the display device 26, 132 an accumulation image, and 134 a broadcast image. Additionally at this time, an accumulation audio is outputted from the speaker 48. In order to switch the audio outputted from the speaker 48 to a broadcast audio, the user only needs to push the right window key 102 (because the broadcast image is displayed on the right of the screen).

As discussed above, according to the image processing apparatus of the second embodiment, when the instruction to temporarily stop the reproduction of the accumulation image is detected while the broadcast image and the accumulation image are displayed on the display device 26, the displaying of the accumulation image whose reproduction has been temporarily stopped can be automatically stopped, and the size of the broadcast image can be automatically increased. Thus, the broadcast image can be made easier to be viewed. Moreover, in this case, when the instruction to resume the reproduction of the accumulation image is detected, the sizes of the accumulation image and the broadcast image can be automatically restored to original sizes, and outputting of the accumulation audio can be automatically started.

Incidentally, the aforementioned functions of the second embodiment can use the functions of the first embodiment.

In other words, the image processing process of the second embodiment may be executed by the functions of the first embodiment.

Additionally, the aforementioned functions of the second embodiment can also be realized by programs to be executed by the CPU 62 of FIG. 1.

Third Embodiment

Figure 8:
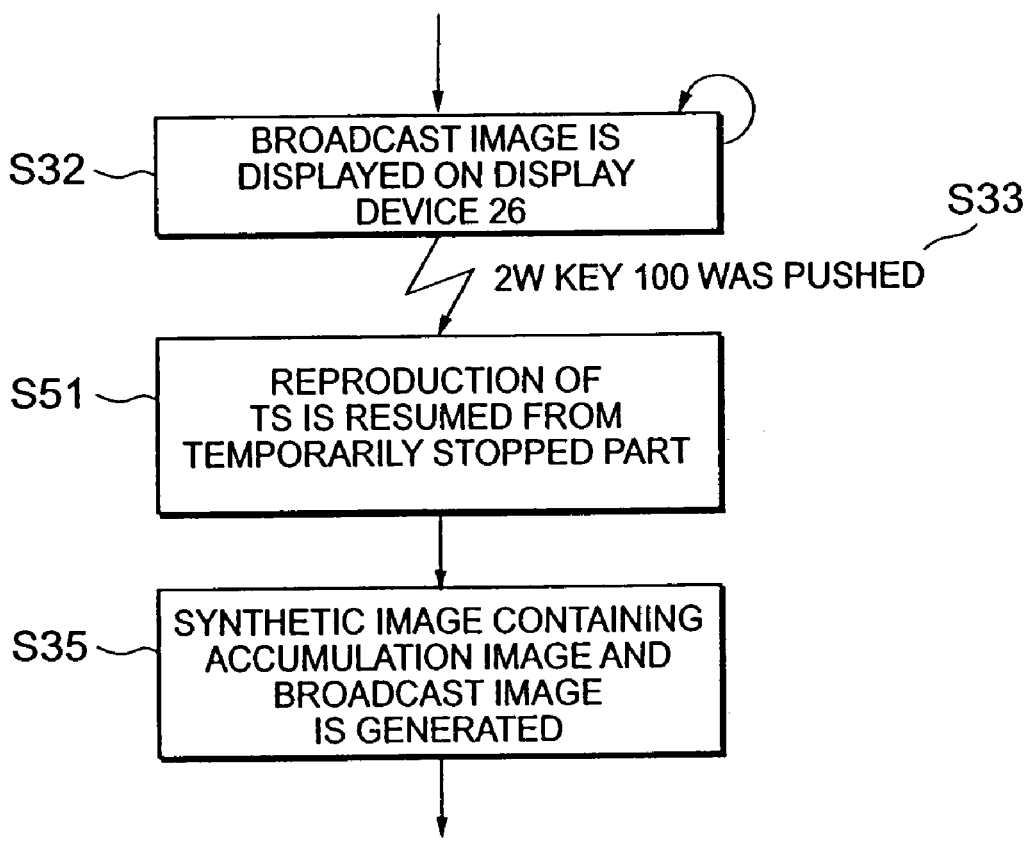
FIG. 8 is a flowchart showing an operation process of an image processing apparatus of a third embodiment.

FIG. 8 is a flowchart explaining an operation process of the image processing apparatus of a third embodiment. The third embodiment explained herein is a partial modification of the first embodiment. Specifically, the process of step S34 of FIG. 5 is replaced by the process of step S51 of FIG. 8. The process from step S11 to step S22 of FIG. 4, the process from step S23 to step S33 of FIG. 5, and the process from step S35 to step S36 of FIG. 5 are similar to those of the first embodiment, and thus detailed description will be omitted.

Step S51: the HDD interface 28 resumes the reproduction of the transport stream a little before the part temporarily stopped in step S31 (e.g., 3 seconds before).

As discussed above, according to the image processing apparatus of the third embodiment, since the reproduction of the transport stream can be resumed before a predetermined time (e.g., 3 seconds before), it is possible to prevent overlooking of the accumulation image immediately after the resumption.

Incidentally, the aforementioned functions of the third embodiment can be applied not only to the image apparatus of the first embodiment but also to the image apparatus of the second and fifth embodiments.

Additionally, the aforementioned functions of the third embodiment can also be realized by programs to be executed by the CPU 62 of FIG. 1.

Fourth Embodiment

Figure 9:
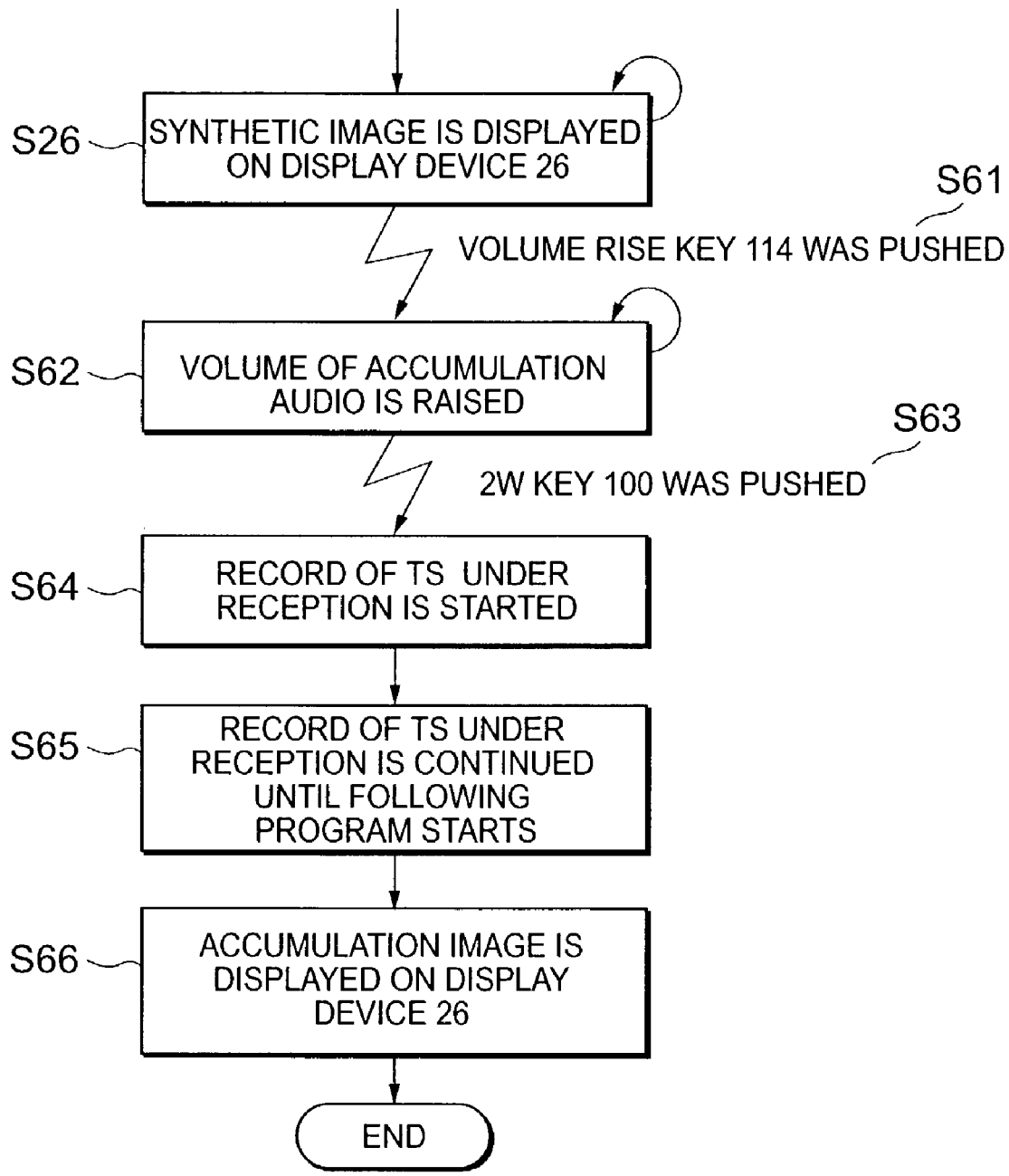
FIG. 9 is a flowchart showing an operation process of an image processing apparatus of a fourth embodiment.

FIG. 9 is a flowchart explaining an operation process of the image processing apparatus of a fourth embodiment. The image processing apparatus of the fourth embodiment explained herein is a partial modification of the image processing apparatus of the first embodiment. The image processing apparatus of the fourth embodiment is similar in constitution and functions to the image processing apparatus of the first embodiment, and thus detailed description thereof will be omitted. In the fourth embodiment described herein, the process from step S27 to step S36 of FIG. 5 is replaced by the process from step S61 to S66 of FIG. 9. Additionally, the process from step S11 to step S22 of FIG. 4, and the process from step S23 to S26 of FIG. 5 are also similar to those of the first embodiment, and thus detailed description will be omitted.

Step S61: after the process of step S26, the CPU 62 determines whether the volume up key 114 has been pushed or not. If the pushing of the volume up key 114 is detected, the CPU 62 starts control for the process of step S62.

Step S62: the amplifier 46 raises a volume of the accumulation audio. The speaker 48 outputs the accumulation audio obtained from the amplifier 46.

Step S63: the CPU 62 determines whether the 2-window key 100 has been pushed or not. If the pushing of the 2-window key 100 is detected, the CPU 62 starts control for the process from step S64 to step S66.

Step S64: the HDD interface 28 automatically starts a process for recording the transport stream obtained from the demodulation & error correction unit 14 in the HDD 30. In other words, the recording of the transport stream under reception is automatically started.

Step S65: the HDD interface 28 continues the recording of the transport stream under reception until a start of a next program in accordance with an instruction from the CPU 62.

Step S66: the resolution conversion unit 36 adjusts a resolution of the accumulation image obtained from the image decoder 34 to match a size of the accumulation image with a screen size of the display device 26. The OSD 64 generates display information (e.g., "HDD PLAY") indicating on-going reproduction of the accumulation image. The synthesis unit 22 superposes the display information obtained from the OSD 64 on a part of the accumulation image obtained from the resolution conversion unit 36. At this time, the synthesis unit 22 can also superpose display information (icon or the like) indicating on-going recording of the broadcast image on a part of the accumulation image. Additionally, the synthesis unit 22 does not synthesize the accumulation image and the broadcast image which is currently recorded, and supplies only the accumulation image to the D/A converter 24. The D/A converter 24 subjects the accumulation image obtained from the synthesis unit 22 to D/A conversion. The display device 26 displays the accumulation image obtained from the D/A converter 24.

As discussed above, according to the image processing apparatus of the fourth embodiment, when the 2-window mode (display mode for displaying the synthetic image containing the broadcast image and the accumulation image on the display device 26) is switched to the HDD mode (display mode for displaying only the accumulation image on the display device 26), the recording of the broadcast image and the broadcast audio can be automatically started. Thus, sequels of the broadcast image and the broadcast audio can be conveniently viewed and listened to after the viewing and listening of the accumulation image and the accumulation audio.

Incidentally, the aforementioned functions of the fourth embodiment can be applied not only to the image processing apparatus of the first embodiment but also to the image processing apparatus of the second and fifth embodiments.

Additionally, the aforementioned functions of the fourth embodiment can also be realized by programs to be executed by the CPU 62 of FIG. 1.

Fifth Embodiment

Figure 10:
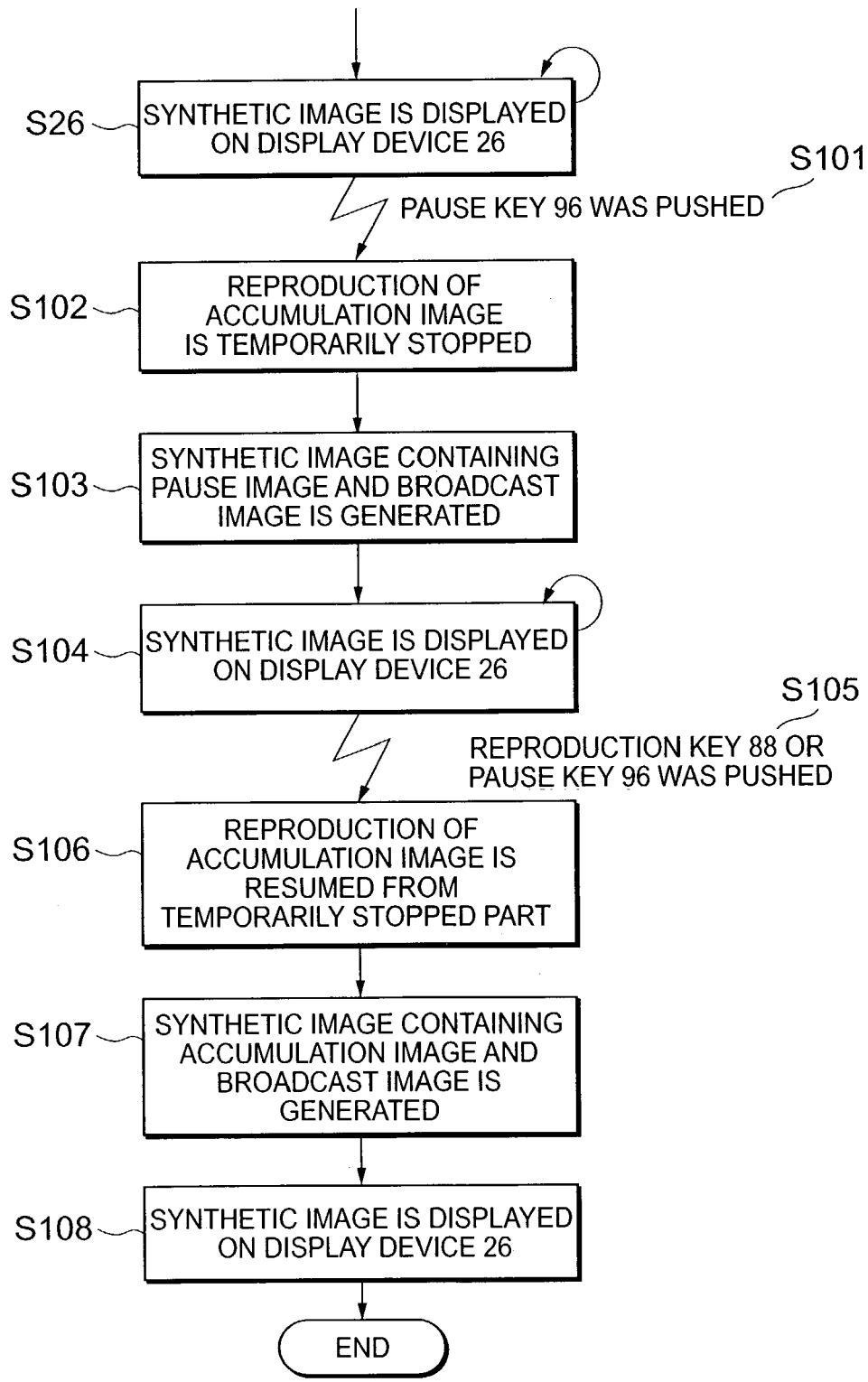
FIG. 10 is a flowchart showing an operation process of an image processing apparatus of a fifth embodiment.

FIG. 10 is a flowchart explaining an operation process of the image processing apparatus of the fifth embodiment. The image processing apparatus of the fifth embodiment is similar in constitution and functions to the image processing apparatus of the first embodiment, and thus detailed description thereof will be omitted. Additionally, the process from step S11 to step S22 of FIG. 4, and the process from step S23 to step S26 of FIG. 5 are also similar to those of the first embodiment, and thus detailed description will be omitted.

Step S101: after the process of step S26, the CPU 62 determines whether the pause key 96 has been pushed or not. If the pushing of the pause key 96 is detected (i.e., instruction to request a temporary stoppage of the reproduction of the accumulation image and the accumulation audio is detected), the CPU 62 starts control for the process from step S102 to step S104.

Step S102: the HDD interface 28 temporarily stops the reproduction of the transport stream automatically. The switch 42 selects a broadcast audio obtained from the audio decoder 38, and supplies it to the D/A converter 44. The speaker 48 automatically starts outputting of the broadcast audio obtained from the amplifier 46.

Step S103: the resolution conversion unit 36 changes a resolution of an accumulation image whose reproduction has been temporarily stopped (pause image, hereinafter) to match a size of the pause image with a screen size of the display device 26. The OSD 64 generates display information (HDD PAUSE) indicating a temporary stoppage of the reproduction of the accumulation image. The synthesis unit 22 superposes the display information obtained from the OSD 64 on a part of the pause image obtained from the resolution conversion unit 36. On the other hand, the resolution conversion unit 20 adjusts a resolution of the broadcast image obtained from the image decoder 18 to set a size of the broadcast image to a size of about ½ of a screen size of the display device 26. The OSD 64 generates display information (e.g., "6ch") indicating a channel number of the broadcast image.

Figure 11:
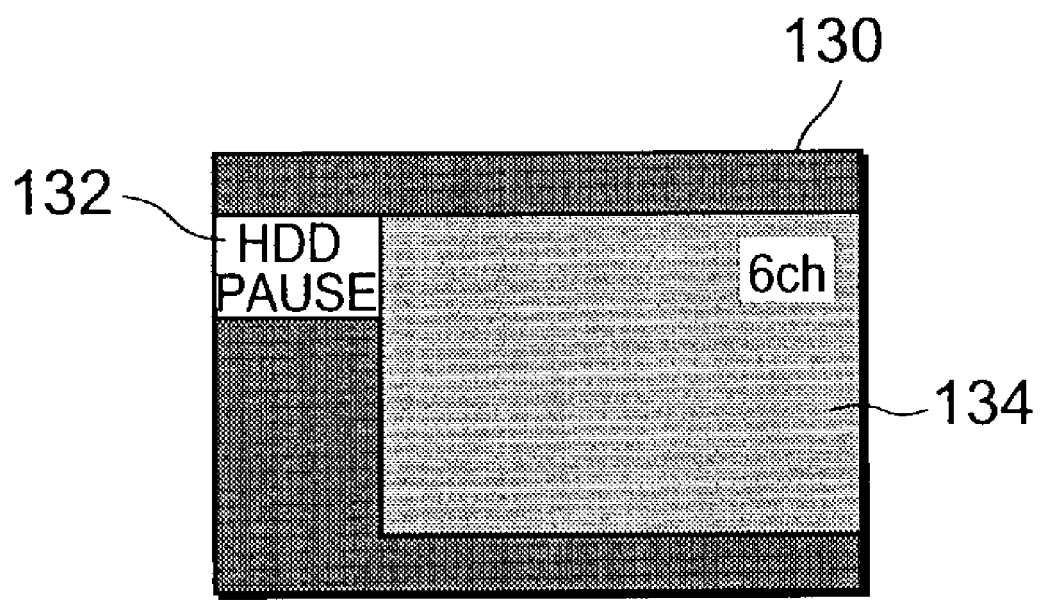
FIG. 11 is a view showing an example of an image displayed on the display device 26 of FIG. 1.

Step S104: the synthesis unit 22 generates a synthetic image containing the broadcast image obtained from the resolution conversion unit 20 and the pause image obtained from the resolution conversion unit 36. The D/A converter 24 subjects the synthetic image obtained from the synthesis unit 22 to D/A conversion. The display device 26 displays the synthetic image obtained from the D/A converter 24. FIG. 11 shows an example of a synthetic image displayed by the display device 26 at this time. In FIG. 11, a reference numeral 130 denotes a screen of the display device 26, 132 a pause image, and 134 a broadcast image. As shown in FIG. 11, as the accumulation image whose reproduction has been temporarily stopped can be displayed small while the broadcast image can be displayed large, the broadcast image can be made easier to be viewed, and the temporarily stopped position of the accumulation image can be notified to the user.

Step S105: the CPU 62 determines whether the reproduction key 88 or the pause key 96 has been pushed or not. If the pushing of the reproduction key 88 or the pause key 96 is detected (i.e., instruction to request resumption of the reproduction of the accumulation image and the accumulation audio is detected), the CPU 62 starts control for the process from step S106 to step S108.

Step S106: the HDD interface 28 automatically resumes the reproduction of the transport stream from the part temporarily stopped in step S102. The demultiplexer 32 separates the accumulation image stream from the transport stream obtained from the HDD interface 28, and supplies it to the image decoder 34. Additionally, the demultiplexer 32 separates the accumulation audio stream from the transport stream obtained from the HDD interface 28, and supplies it to the audio decoder 40. The image decoder 34 starts decoding of the accumulation image stream, and the audio decoder 40 also starts decoding of the accumulation audio stream. The switch 42 selects an accumulation audio obtained from the audio decoder 40, and supplies it to the D/A converter 44. The speaker 48 automatically starts outputting of the accumulation audio obtained from the amplifier 46.

Step S107: the resolution conversion unit 20 adjusts a resolution of the broadcast image obtained from the image decoder 18 to set a size of the broadcast image to a size of about ¼ of a screen size of the display device 26. The OSD 64 generates display information (e.g., "6ch") indicating a channel number of the broadcast image. The synthesis unit 22 superposes the display information obtained from the OSD 64 on a part of the broadcast image obtained from the resolution conversion unit 20. On the other hand, the resolution conversion unit 36 adjusts a resolution of the accumulation image obtained from the image decoder 34 to set a size of the accumulation image to a size of about ¼ of a screen size of the display device 26. The OSD 64 generates display information (e.g., "HDD PLAY") indicating ongoing reproduction of the accumulation image. The synthesis unit 22 superposes the display information obtained from the OSD 64 on a part of the accumulation image obtained from the resolution conversion unit 36.

Step S108: the synthesis unit 22 generates a synthetic image containing the broadcast image obtained from the resolution conversion unit 20 and the accumulation image obtained from the resolution conversion unit 36. The D/A converter 24 subjects the synthetic image obtained from the synthesis unit 22 to D/A conversion. The display device 26 displays the synthetic image obtained from the D/A converter 24. FIG. 6C shows an example of a synthetic image displayed by the display device 26 at this time. In FIG. 6C, a reference numeral 130 denotes a screen of the display device 26, 132 an accumulation image, and 134 a broadcast image. Additionally at this time, an accumulation audio is outputted from the speaker 48. In order to switch the audio outputted from the speaker 48 to a broadcast audio, the user only needs to push the right window key 102 (because the broadcast image is displayed on the right of the screen).

As discussed above, according to the image processing apparatus of the fifth embodiment, when the instruction to temporarily stop the reproduction of the accumulation image is detected while the synthetic image containing the broadcast image and the accumulation image is displayed on the display device 26, the size of the accumulation image whose reproduction has been temporarily stopped can be decreased while the size of the broadcast image can be increased. Thus, the broadcast image can be made easier to be viewed, and the temporarily stopped part of the reproduction of the accumulation image can be notified to the user. Moreover, in this case, when the instruction to resume the reproduction of the accumulation image is detected, the sizes of the accumulation image and the broadcast image can be automatically restored to original sizes, and outputting of the accumulation audio can be automatically started.

It is to be noted that the aforementioned functions of the second embodiment can also be realized by programs to be executed by the CPU 62 of FIG. 1.

The above-described preferred embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. An image processing apparatus capable of displaying a first image obtained from a broadcast wave and a second image reproduced from a storage medium a on display unit, the apparatus comprising:

a first image processing unit adapted to increase a size of the first image if an instruction for temporarily stopping a reproduction of the second image is detected while the first image and the second image are displayed on the display unit; and a second image processing unit adapted to decrease a size of the second image if the instruction for temporarily stopping the reproduction of the second image is detected while the first image and the second image are displayed on the display unit.

2. The image processing apparatus according to claim 1, wherein the first image processing unit decreases the size of the first image if an instruction for resuming the reproduction of the second image is detected while the first image and the second image are displayed on the display unit; and the second image processing unit increases the size of the second image if an instruction for resuming the reproduction of the second image is detected while the first image and the second image are displayed on the display unit.

3. The image processing apparatus according to claim 2, wherein the image processing apparatus resumes the reproduction of the second image from before a stopped position if the reproduction of the second image is resumed.

4. A method used in an image processing apparatus capable of displaying a first image obtained from a broadcast wave and a second image reproduced from a storage medium on a display unit, the method comprising the steps of:

increasing a size of the first image if an instruction for temporarily stopping a reproduction of the second image is detected while the first image and the second image are displayed on the display unit; and decreasing a size of the second image if the instruction for temporarily stopping the reproduction of the second image is detected while the first image and the second image are displayed on the display unit.

5. The method according to claim 4, further comprising the steps of:

decreasing the size of the first image if an instruction for resuming the reproduction of the second image is detected while the first image and the second image are displayed on the display unit; and increasing the size of the second image if an instruction for resuming the reproduction of the second image is detected while the first image and the second image are displayed on the display unit.

6. The method according to claim 5, further comprising the step of resuming the reproduction of the second image from before a stopped position if the reproduction of the second image is resumed.

* * * * *

UNITED STATES PATENT AND TRADEMARK OFFICE
CERTIFICATE OF CORRECTION

PATENT NO. : 7,119,851 B2  
APPLICATION NO. : 10/347375  
DATED : October 10, 2006  
INVENTOR(S) : Kenichiro Ono Page 1 of 1

It is certified that error appears in the above-identified patent and that said Letters Patent is hereby corrected as shown below:

<u>COLUMN 4</u>

Line 15, "broad cast" should read --broadcast--.

<u>COLUMN 6</u>

Line 42, "math a size" should read --match a size--.  
Line 62, "CPU62" should read --CPU 62--.

<u>COLUMN 14</u>

Line 46, "not be" should read --not to be--.  
Line 58 Claim 1, "medium a on" should read --medium on a--.

Signed and Sealed this

Fifteenth Day of May, 2007

JON W. DUDAS  
*Director of the United States Patent and Trademark Office*